United States Patent [19]

Klein et al.

[11] Patent Number: 5,499,864
[45] Date of Patent: Mar. 19, 1996

[54] BICYCLE WHEEL RIMS

[75] Inventors: Gary G. Klein; Darrell Voss, both of Chehalis, Wash.

[73] Assignee: Klein Bicycle Corporation, Chehalis, Wash.

[21] Appl. No.: 77,196

[22] Filed: Jun. 16, 1993

[51] Int. Cl.⁶ .................................................... B60B 21/02
[52] U.S. Cl. .............................. 301/95; 301/58; 301/97
[58] Field of Search ........................... 301/55, 58, 95, 301/96, 97, 98, 110.5

[56] References Cited

U.S. PATENT DOCUMENTS

| | | | |
|---|---|---|---|
| 2,937,905 | 5/1960 | Altenberger | 301/58 |
| 2,992,045 | 7/1961 | Martinet | 301/97 |
| 3,784,260 | 1/1974 | Araya | 301/97 |
| 4,040,671 | 8/1977 | Hersh | 301/58 |
| 5,228,756 | 7/1993 | Krampera | 301/95 X |

FOREIGN PATENT DOCUMENTS

| | | | |
|---|---|---|---|
| 786739 | 9/1935 | France | 301/97 |
| 833629 | 10/1938 | France | 301/97 |
| 1001618 | 2/1952 | France | 301/97 |
| 1012963 | 7/1952 | France | 301/58 |
| 2351803 | 12/1977 | France | 301/97 |
| 2673888 | 9/1992 | France | 301/95 |
| 0154302 | 11/1981 | Japan | 301/97 |
| 16340 | 12/1886 | United Kingdom | 301/97 |
| 6785 | of 1900 | United Kingdom | 301/96 |
| 19576 | of 1902 | United Kingdom | 301/96 |

*Primary Examiner*—Russell D. Stormer
*Attorney, Agent, or Firm*—Jim Zegeer

[57] ABSTRACT

The invention disclosed herein is a light weight, mountain bicycle competition wheel rim. The invention provides improved fatigue and impact resistance compared to prior art designs. The invention makes maximum use of advanced, high strength aluminum alloy materials, improving its stiffness-to-weight and strength-to-weight ratios. The superior structural performance of the invention is provided by a unique truss type section geometry that efficiently utilizes the material to maximize bending and torsional stiffness and strength while minimizing weight.

17 Claims, 6 Drawing Sheets

5,499,864

BICYCLE WHEEL RIMS

INTRODUCTION

This invention relates to improved bicycle wheel rims and, more particularly, to improve bicycle wheel rims for competition mountain bicycles. These rims offer superior strength, stiffness and weight characteristics compared to other, prior art, wheel rims.

Bicycle wheel rims have been in production for many years. These "production" rims come in a variety of shapes, sizes and material makeup, suitable for the general cycling enthusiast. The vast majority of these rims, however, are not designed to handle the extreme loading conditions encountered by the competition mountain biker. This invention addresses these extreme loading conditions by providing an optimally shaped section geometry that makes maximum use of the weight, stiffness and strength characteristics of modern, medium and high strength aluminum alloys. The disclosed designs demonstrate significantly higher stiffness and strength, at reduced weight, compared to the leading competition rims available on the market.

BACKGROUND

There are basically three types of mountain bicycle rims available today. These rim types are depicted by their spoke configuration. They include: a) individual wire spokes, hereafter referred to as the Type I design, b) integral rim/spoke design and c) solid disc (no spokes). The most common rim type is the Type I design (individual wire spokes). This disclosure applies to the Type I rim. FIG. 1 illustrates a Type I wheel assembly, and the associated components. The assembly consists of the rim (1) connected to a hub (3) by a system of spokes (2). The spokes are usually made from a stainless steel material configured with a hook at the hub end and a threaded, adjustable part (spoke nipple) at the rim end. This arrangement allows the individual spokes to be adjusted to a pre-tension load (PTL). These tension loads create a hoop tension load (HTL) in the hub and a hoop compression load (HCL) in the rim. After installation, the stress field within the wheel assembly causes the entire assembly to behave as a unit, allowing it to support both radial and lateral loads. The spoke system is not considered part of the invention, but is presented here to explain the spoke accommodations required by the invention.

There is currently a demand for a high performance bicycle wheel rims for the off-road competition environment. These high performance rims require both high strength and high stiffness at minimum weight (high strength-to-weight and stiffness-to-weight ratios). What sets this invention apart from other prior art designs is the use of unique, optimized section geometries that utilize the strength and stiffness properties of modern medium and high strength aluminum alloy materials to achieve superior strength-to-weight and stiffness-to-weight ratios. This invention has been evaluated against two leading bicycle rim designs, one representing one of the strongest and the other one of the lightest rims available on the market. This evaluation was made using a high resolution finite element computer modeling system. The results of this study are presented herein in support of this invention.

PRIOR ART WHEEL RIM DESIGN

Type I bicycle tire rims are designed to provide five basic functions, namely:

1) Locking device for mounting pneumatic tires.
2) Structural support for tire loads.
   A. Rolling load
   B. Forward traction load
   C. Braking loads
   D. Side cornering loads
   E. Impact loads/road or trail hazards
3) Pressure reaction surface for inner tube.
4) Braking surface for caliper brakes.
5) Spoke attachments.

These basic design functions have a direct bearing on the overall geometry of the rim. If the rim is to be compatible with standard hub, spoke, tire and brake designs, then certain limitations are required on the rim geometry. Within these restrictions, however, the section may be optimized for stiffness, strength and weight. FIGS. 2 and 3 are section views of two leading (prior art) high performance mountain bicycle rim designs. FIG. 2 represents one of the strongest competition rim designs on the market (hereafter this design will be referred to as Reference #1) and FIG. 3 one of the lightest (hereafter this design will be referred to as Reference #2). These designs are used as a reference in evaluating the structural performance of the disclosed designs.

FIGS. 2 and 3 identify the key structural areas of the two referenced designs. The pneumatic tire is held into place by a lip (1) that interfaces with the bead of the tire. When pressure is applied to the tire/tube cavity (6), the lip and tire bead interlock, thus securing the tire to the rim. The pressure loads of the inner-tube are supported by the reaction surface (2). This surface contains access holes (3a), at evenly spaced intervals, to allow the installation of the wheel spokes. The individual spokes are attached to the rim by a spoke nipple (not shown), a threaded head, that bears up against the shoulder in the spoke hole (3b), located on the lower rim surface (4). The threaded nipple reacts the spoke tension loads.

The side surface of the rim (7) serves several functions. First, it provides the braking surface for caliper brakes. Second, the lower part (7b), together with the pressure reaction surface (2) and the lower rim surface (4), forms a closed cavity (5). The material surrounding the cavity functions as a structural torque tube, in resisting the torsional loads applied to the section. This portion of the section is the major contributor to the torsional rigidity of the rim. Third, the circumferential flange or upper portion of the side surface (7a) reacts a major portion of the tire pressure load and the entire tire side loads. It also contributes to the bending rigidity of the rim.

STRUCTURAL CONSIDERATIONS IN HIGH PERFORMANCE BICYCLE RIM DESIGN

In general, the primary structural loading of a wheel rim is comprised basically of three loading components, 1) static tire pressure, 2) static spoke pre-load and 3) dynamic tire/ground reaction loads. The static tire pressure loads and the spoke pre-load are illustrated in FIG. 4. This loading includes the direct bearing load (DB) applied to the pressurized surfaces of the rim (1). It also includes an in-plane tire-bead load (TBI) and out-of-plane tire-bead load (TBO) acting along the circumference of the rim lip (1).

The spoke pre-load (SP) is a radial, concentrated tension load acting at the spoke interval on rim surface (2). The spoke load acts in the direction of the spoke with an angle (SA) from the true radial. The angle (SA) alternates between +and − values.

The primary tire/ground impact load components include both radial and lateral loads. These loads are transmitted to the rim structure by the tire bead. However, unlike the tire pressure loads, these loads are transferred over only a fraction of the rim circumference. These relatively concentrated tire bead loads are superimposed on the tire pressure and spoke pre-loads shown in FIG. 4.

Bicycle tire rims tend to fail structurally in several distinct modes, depending on the nature of the tire loads. For repeated impact loads, fatigue cracking can occur at areas of high stress concentration or repeated flexing. Generally these areas are near the spoke attachments; However, they can occur in other areas of the rim such as the brake surface (Item 7, FIG. 2). Other modes of failure include total collapse of the rim from a hard radial (or side) impact or yielding of the rim at the brake surface due to a combination of excessive pressure and side loading of the tire. Other hard maneuvers, such as a high speed cornering impact, impose high torsional loads on the rim and if not properly reacted can result with a permanent distortion of the rim or cracking at the corners of the closed cavity (Item 5, FIG. 2). The torsional rigidity of the rim section becomes an important factor for this type of loading.

FATIGUE CRACKING

Past experience reveals several areas of a rim section susceptible to fatigue cracking. These areas must be considered critical in the design of the rim. Probably the area most susceptible to cracking is the rim/spoke connection. This is due to the concentrated nature of the spoke loads and the large stress risers in the vicinity of the attachments. Fatigue cracking in these areas are generally a result of the tire/ground impact loads as well as the normal riding types of loads experienced during the life of the rim. The impact loads increase the tension loads of spokes located away from the point of impact and decrease the tension loads of the spokes adjacent to the point of impact. The resulting loading history of an individual spoke thus consists of a steady state pre-tension load with an oscillating load component superimposed. This type of loading can lead to fatigue failures in the spoke, the spoke nipple or in rim in the vicinity of the spoke attachment hole (Item 3b, FIG. 2).

The brake area of the rim is another area where fatigue cracking can occur. These cracks are usually a result of the wearing away of metal, by the braking function, resulting in higher local stresses.

RIM IMPACT RESISTANCE

Competition bicycle rims experience occasional tire impacts that are quite severe. These impact loads do not occur frequently enough to be considered fatigue loads but, nevertheless, are a threat to the life of the rim structure. The rim structure must be designed with adequate load carrying capacity to handle these loads without yielding or buckling the rim. The failure modes most common for this type of loading include spoke "pull-through" and full or partial collapse of the rim.

Spoke "pull-through" occurs when the tension load in the spoke is sufficient to deform the rim inwardly at the spoke hole (Item 3b, FIG. 2). This is a plastic failure where material yielding occurs in the local area, allowing the spoke hole to open.

Rim collapse can occur for very hard impacts. Collapse occurs when the rim hoop, bending and torsional stresses exceed the inelastic buckling capability of the section. For stable rim sections having high torsional rigidity, such as the sections shown in FIGS. 2 and 3, buckling is usually quite localized, occurring near the point of impact. This type of buckling is due primarily to localized compression stresses in the rim, near the point of impact. Sections weak in torsion can involve both bending and torsional buckling of the rim section when subject to high compression stresses.

TIRE/RIM CONNECTION

The geometry of the rim lip (Item 1, FIG. 2) is important to the lateral stability of the tire. If the lip is not properly shaped, the tire can "peel" off of the rim under high lateral tire loads, or excessive pressure.

Objects of the present invention include the provision of an improved bicycle wheel rim, particularly improvements in lightweight mountain bicycle competition wheel rims. A further object of the invention are to provide a wheel rim having improved fatigue and impact resistance; to provide a high strength aluminum alloy rim with improved stiffness-to-weight and strength-to-weight ratio.

According to the invention superior structural performance is achieved by a unique truss-type section geometry that efficiently utilizes the material to maximize bending and torsional stiffness and strength while minimizing weight. The wheel rim features a pair of circumferential side flanges joined to at least one annular torque tube. A substantially flat tension web and one or more annular ribs or ridges are juxtaposed adjacent the spoke connecting area of the torque tube. The rim is preferably formed from a vacuum formed aluminum alloy (aluminum containing minority percentages of lithium, copper, silicon, magnesium and zirconium or an aluminum alloyed with minority percentages of silicon, magnesium, chromium, copper, manganese, iron and zirconium) which has been extruded to have cross-sections shown herein and shaped into an annulus and the ends joined by welding, heat treated and anodized in conventional fashion.

BRIEF DESCRIPTION OF THE DRAWINGS

The above and other objects, advantages and features of the invention will become more apparent in view of the following specification and accompanying drawings wherein.

DETAILED DESCRIPTION OF INVENTION

Figure 5:
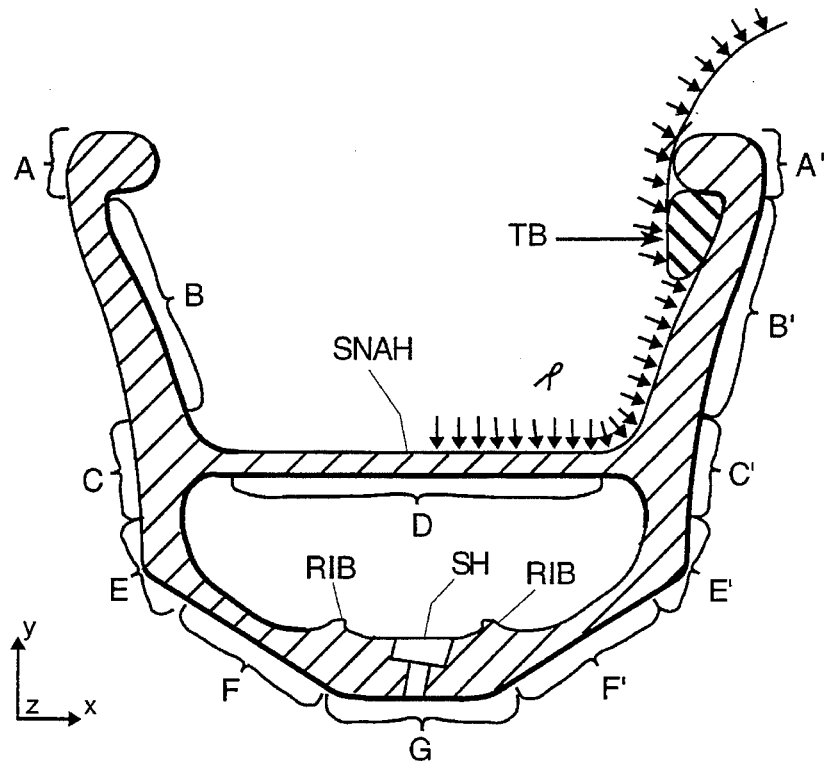
FIG. 5 illustrates a sectional view of a wheel rim embodying a first embodiment of the invention.
Figure 6:
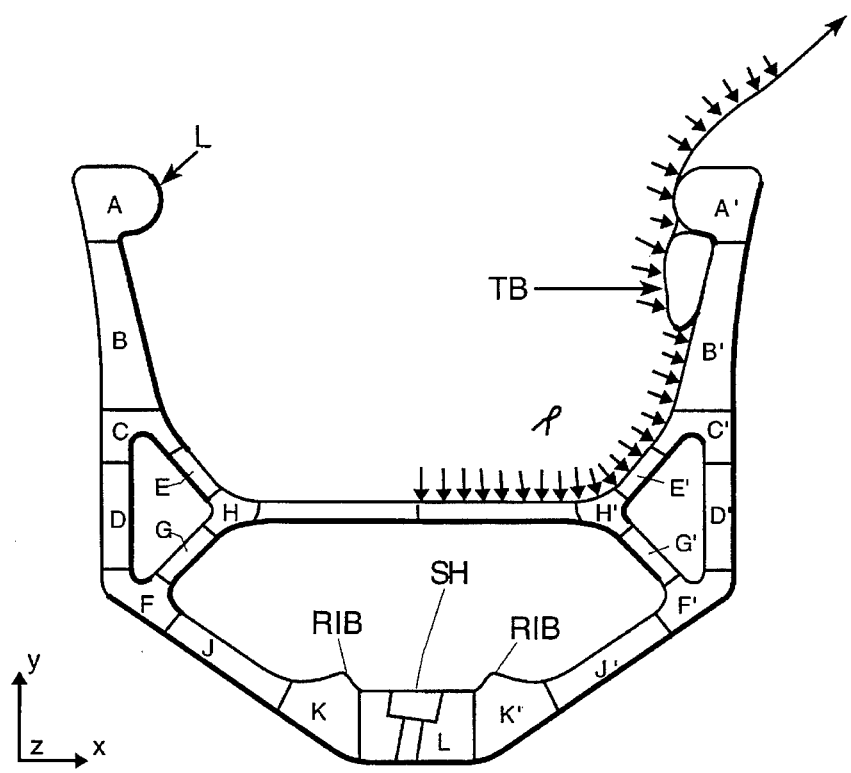
FIG. 6 illustrates a sectional view of a wheel rim embodying a second embodiment of the invention.
Figure 7:
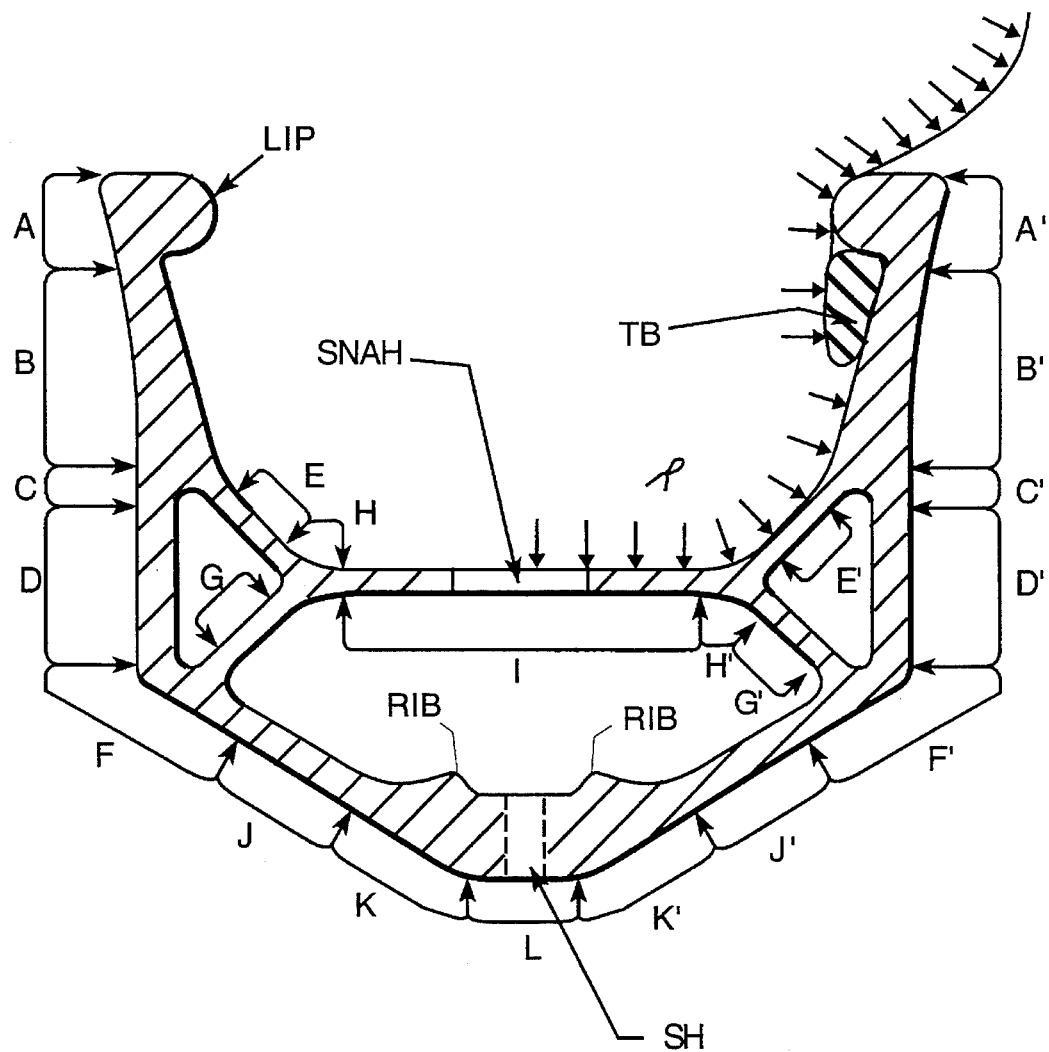
FIG. 7 illustrates a sectional view of a wheel rim embodying a third embodiment of the invention.

The invention disclosed herein is embodied in three rim designs which are illustrated in FIGS. 5, 6 and 7. The inventive concept is to make the rim more of a truss type construction than prior art. FIG. 5 shows a single "hole"

(e.g., annular space) design optimized for the XT140 high strength aluminum/lithium alloy material. This embodiment represents the easiest section to produce, however, it sacrifices some on weight and stiffness. This embodiment is referred to hereafter as Design #1. FIGS. 6 and 7 are two variations of a preferred three "hole" (e.g., three annular spaces) rim embodiment. These are clearly more of a lightweight truss configuration than prior art. These embodiments are somewhat more difficult to manufacture but provide more efficient sections with lower weight and higher stiffness possibilities than the embodiment shown in FIG. 5 (Design #1). The section embodiment in FIG. 6, hereafter referred to as Design #2, is optimized for XT140 high strength aluminum/lithium alloy. The section in FIG. 7, hereafter referred to as Design #3, is optimized for a medium strength aluminum alloy such as 6061-T6.

Figure 9:
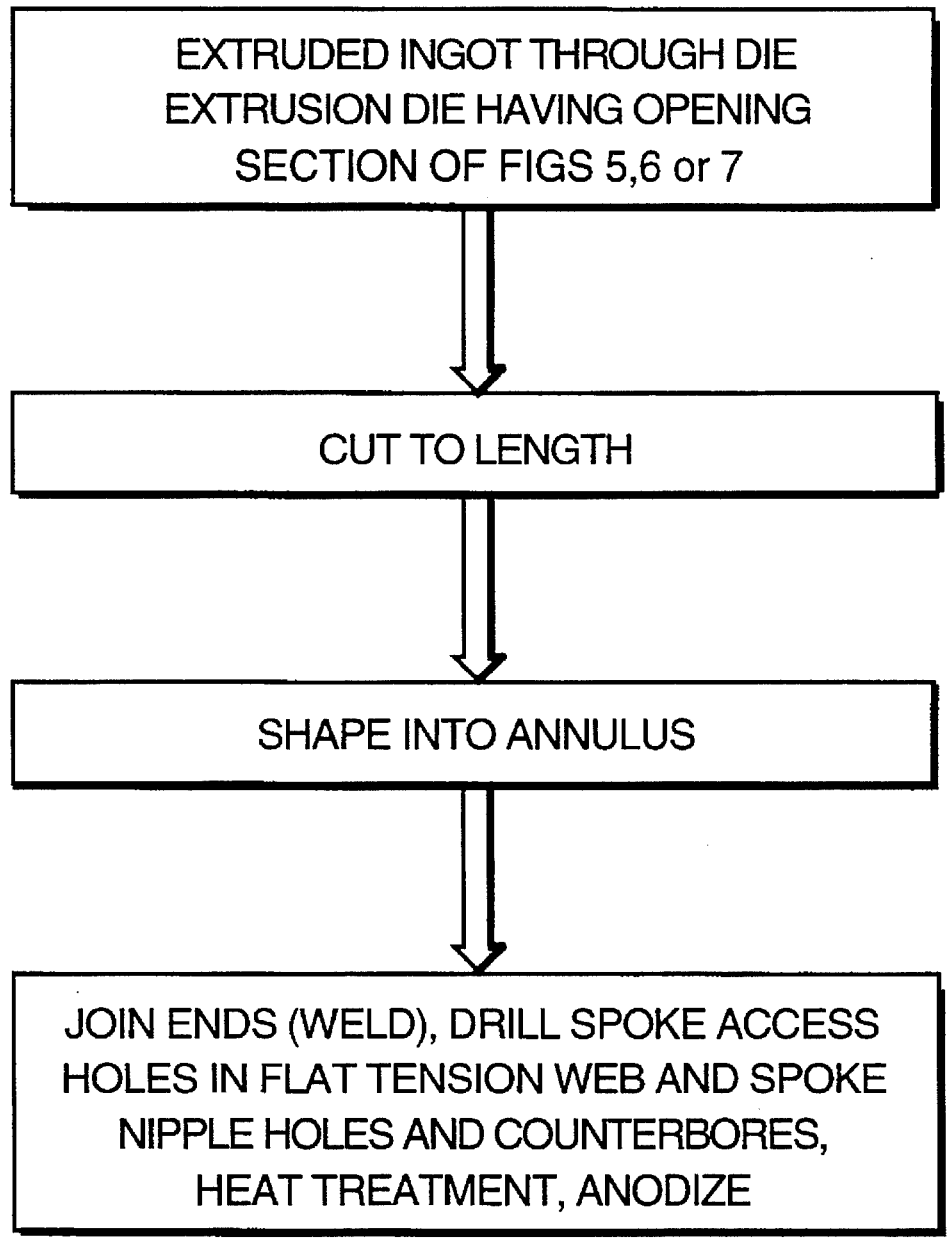
FIG. 9 illustrates the process steps for forming the rim of this invention.

Each embodiment is made by conventional processes, namely, extruding the metal through an extrusion die having the desired open cross-sectional area (FIGS. 5, 6 or 7) cutting to length, shaping the extrusion into an annulus and joining the ends by fusion welding and then heat treating (see FIG. 9).

DESIGN #1, 1-HOLE RIM EMBODIMENT

FIG. 5 shows the key areas making up the section for the first embodiment and the discussion.

Area (A) is the lip of the rim section that interfaces with the tire bead (TB). The interior part of the lip has basically the same shape as prior art designs to insure that this design will be compatible with existing tires on the market. This disclosure makes no claims concerning this area of the lip. However, other parts of the lip have been increased slightly, over prior art designs, to improve the overall bending stiffness of the section.

Areas (B), (C) and (E) serve three basic functions for the rim. First, these areas serve as a primary load transfer path for the tire bead, casing and rim pressure loads. Second, they provide the bearing surface for caliper brake pads. Third, the geometry of area (B) positions the bead of the tire further outboard from the rim center-line, compared to prior art design (for current competition rims), to achieve greater lateral stability for the tire during hard cornering and side skidding maneuvers. Area (B) is angled outboard (by approximatley 18.8 degrees, FIG. 5) rather than vertical, to reduce weight in the bottom part of the rim section. A vertical member would require the base of the section to be widened to accommodate the same opening at the lip. A vertical member would also have to resist increased bending loading from the tire air pressure or more accurately the tire casing tension. The tire casing pulls the tire bead on each side upwards and outward. The larger the tire section is, and the higher the air pressure used, the larger this force is. The sidewall of the rim has to resist this as a cantilever bending stress. The invention uses an angled rim (approximately 18.8 degrees, see FIG. 5) sidewall which is more nearly in line with the pulling direction of the tire casing, resulting in significantly reduced cantilever bending stress in the sidewall. The traditional vertical or nearly vertical rim sidewall is more perpendicular to the pulling direction of the tire casing and thus experiences increased loading, resulting in shorter life or a heavier design.

Areas (B) and (C) are designed as variable thickness "beams" to structurally tie the tire bead (TB) to the torque tube "box" section of the rim (D–C'–E'–F'–G'–H–G–F–E–C). The thickness profiles for areas (B) and (C) are optimized to provide the minimum section possible for handling the expected tire loads. These areas are optimized for both strength and stiffness. Extra material is added to these areas (including Area E) to allow the wearing away of material by the brake pads, without detrimentally effecting the safety of the structure. Areas (C) and (E) are provided with generous interior fillets to reduce local stresses and the possibility of fatigue cracking in the region.

Figure 1:
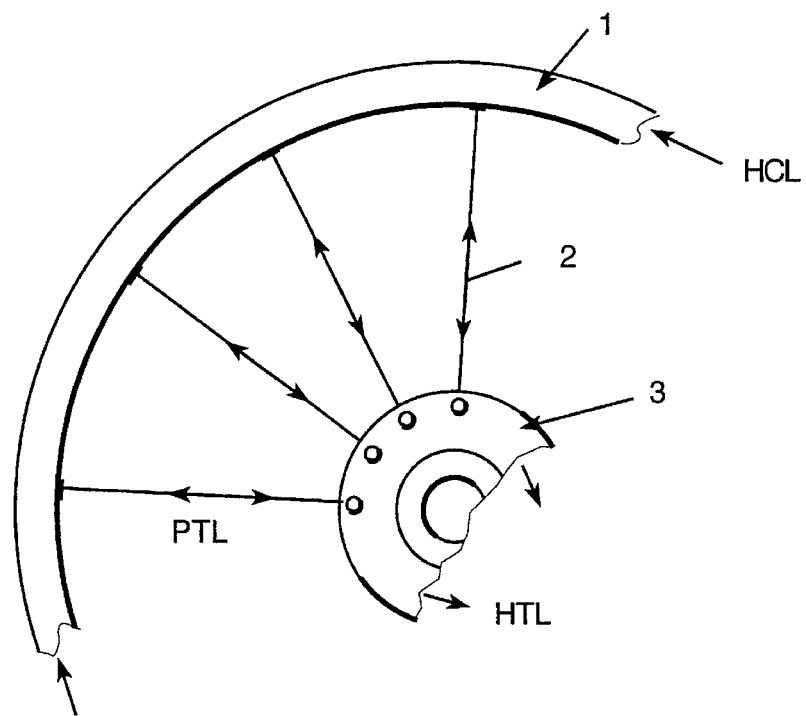
FIG. 1 is an illustration of a typical bicycle wheel assembly including tire, rims, spokes and hub.
Figure 2:
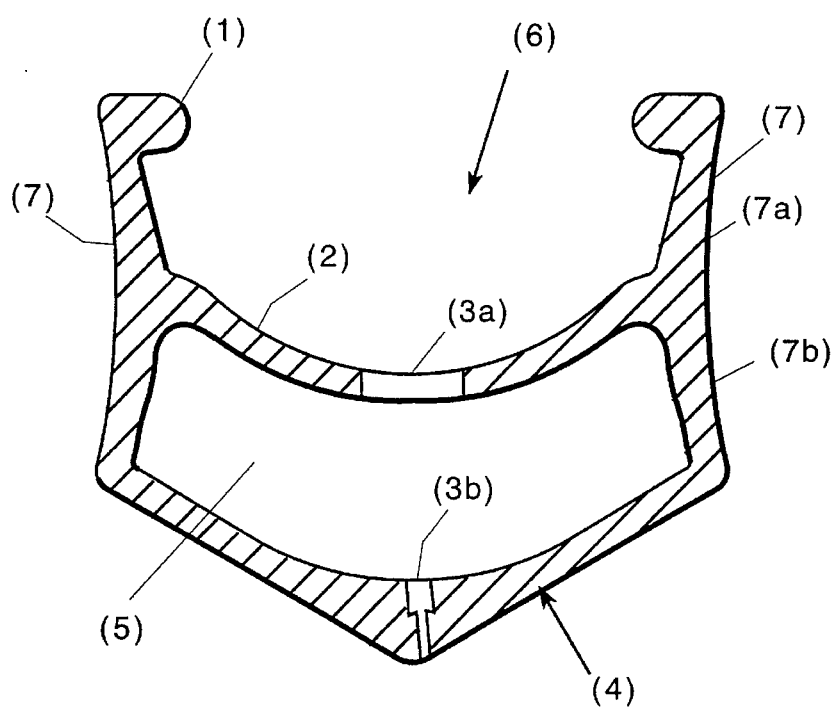
FIGS. 2–4 are sectional views of prior art wheel rims (as discussed above)
Figure 3:
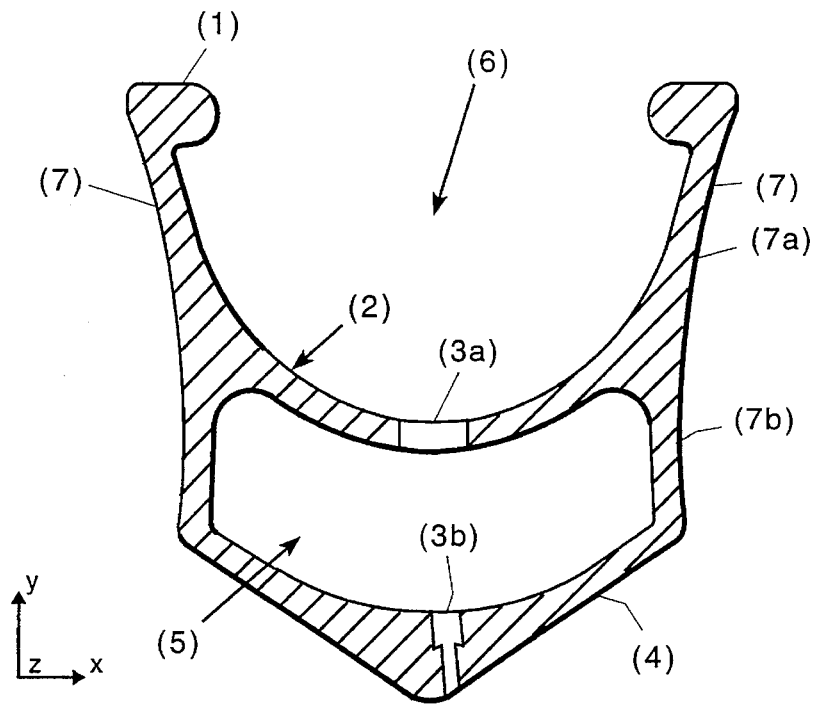
Figure 4:
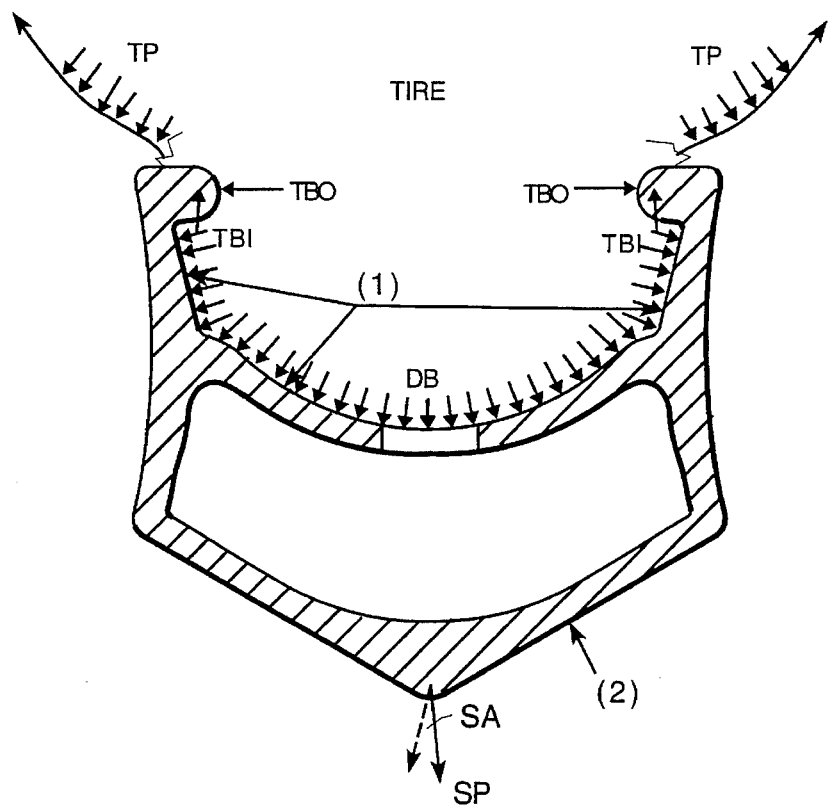

Area (D) serves principally as a simple tension web and an inner air pressure reacting member. This member structurally ties areas (C) and (C'), helping to relieve areas (E), (F), (G) and (H) from high bending stresses. Area (D) also supports the pressure from the inner tube and helps to form a closed torque box section (D–C'–E'–F'–G'–H–G–F–E–C). This box section provides the torsional rigidity of the rim section. Unlike prior art designs (see FIGS. 2 and 3), area (D) is designed to be flat rather than concave. This increases the lateral stiffness of the section, reduces weight and also improves the torsion stiffness of the box section.

Areas (E) and (F) also form a part of the torque box previously mentioned. These areas include generous interior filets to reduce local stresses and the possibility of fatigue cracking. The thickness profile in this region has been optimized to reduce weight. The areas (E) and (F) are designed to transfer the load from the spokes to the base of the cantilever loaded side walls as directly as possible, while retaining adequate braking contact, angle and stiffness. This improves rim rigidity and increases strength over the less direct shapes illustrated in FIGS. (2), (3) and (4).

Area (G–H–G') supports the spoke loads and contributes to the overall bending stiffness of the section. Spoke reinforcement ridges are provided by areas G and G' to locally reinforce the spoke holes (SH). These ridges prevent the formation of radial fatigue cracks around the spoke holes from excessive flexing in this area. They also are in contact with the spoke nipple heads on each side of the spoke nipple, providing larger contact area than prior art designs, and distributing the spoke tension loads more uniformly to the rim (close to the spoke hole).

Area (E–F–G–F'–E') is under great stress from the spoke loads. The traditional rim design has been a generally rectangular box section rim. The spoke is attached through one of the long sides of the box. The manufacturer either uses a double ferrule to tie the upper and lower rim surfaces together, or uses a much heavier wall on the lower surface. The trouble is that a tension load pulling perpendicular to a flat surface easily deforms and strains that surface. The most common form of fatigue failure in these conventional rims consists of longitudinal cracks developing adjacent to the spoke holes. The invention takes on a nearly triangular or "V" shape. The idea is to stress the rim walls in tension within the plane of the walls, instead of bending them out of plane. The walls are much stronger in this condition and, therefore, do not have to be made nearly as heavy. The spoke area needs reinforcement due to the spoke hole stresses. Because of this, a heavier wall straight section is provided at the base (G). Section (E) needs to be shaped, for braking surface function, however, section (F) proceeds directly upward to the lower portion of the braking surface from the edge of the spoke nipple, thus allowing it to be light weight and yet retain high strength and rigidity.

There are road rims made with a fundamentally triangular or "V" shaped lower sections. These have principally been designed for aerodynamics. In most cases they are not as light as the best traditional road rims. They also do not incorporate the straight section (D) or angled sidewalls (B). These aerodynamic road rims demonstrate improved stiffness and durability over the standard rim sections. The typical fatigue failure in these consists of lateral cracks originating at the spoke hole due to bending flexure of the whole rim section.

DESIGNS #2 AND #3, 3-HOLE RIM DESIGN CONCEPT

FIGS. 6 and 7 describe two 3-hole rim design concepts. The two sections are basically the same except for local thickness variations in certain areas. The concept shown in FIG. 6 is a minimum weight design, optimized for high strength XT140 aluminum/lithium alloy. The concept shown in FIG. 7 is a slightly heavier design, optimized for a medium strength aluminum alloy. Since the two embodiments are so similar, this discussion applies to both. Either FIG. 6 or FIG. 7 may be referred to for this discussion.

For this rim design, three torque "tube" regions are formed within the section. These regions, identified as C–E–H–G–F–D, C'–D'–F'–G'–H'–E' and I–H'–G'–F'–J'–K'–L–K–J–F–G–H are highly resistant to torsion. These built-in torque tubes contribute significantly to the torsional rigidity of the entire section. The internal fillets of these torque tubes are provided with generous radiuses to reduce the local stresses and the possibility of fatigue cracking.

Area (A) denotes the rim lip which interfaces with the tire bead (TB). The interior part of the lip is configured basically the same as prior art designs to assure that the rim section will be compatible with existing tires on the market. This disclosure make no claims for this area of the lip. However, other parts of the lip have been increased slightly, over prior art designs, to increase the overall bending stiffness of the rim.

Areas (B), (C) and (E) of the section provide the same basic functions with the same advantages as described above for Design #1, namely:

1) Primary load transfer path for the tire-bead and rim-pressure loads.
2) Bearing surface for caliper brake pads.
3) Geometry of area (B) positions the bead of the tire further outboard from the rim center-line to achieve greater tire stability.
4) Geometry of area (B) reduces the stress levels in the sidewall due to tire casing forces.

Areas (B) and (C) are designed as a variable thickness "beam" to structurally tie the tire bead (TB) to the first or upper torque tube (C–E–H–G–F–D) of the rim. The thickness profiles for areas (B) and (C) are optimized to provide the minimum section possible to handle the expected loads while minimizing lateral displacements. Extra material is added to these areas, including area (D), to allow for material wear (from braking) without detrimentally effecting the structure. Area (C) is provided with a generous interior fillet to reduce local stresses in the region and the possibility of fatigue cracking.

Area (I) serves primarily as a simple tension web, connecting the two upper torque tubes. This relieves area L from high bending stresses. Area (I) also supports the pressure from the inner tube and helps to form the larger torque tube section. Unlike prior art designs (see FIGS. 2 and 3), area L is designed to be flat rather than arched. This increases the lateral stiffness and structural integrity of the section while reducing mass.

Area (K–L–K') supports the spoke loads. Spoke ridges are provided at areas (K) and (K') for local reinforcement. This material helps to reduce the stresses in the vicinity of the spoke hole (SH).

Spoke nipple access holes SNAC are provided, one access hold for each spoke connection.

STRUCTURAL ANALYSIS

The rims disclosed herein were evaluated using the finite element modeling method. This is a mathematical procedure for evaluating complex structures on a computer. This method is widely used in industry today. The objective of the analysis reported herein was to a) evaluate the structural performance of the disclosed rim designs and b) compare their performance to several leading, prior art rim designs considered to be the nearest competition.

THE FINITE ELEMENT METHOD

The finite element analysis (FEA) method breaks the material continuum of a structure into a finite number of mathematical elements. These elements may be two or three dimensional beams, plates and shells or three dimensional solids. The deformation characteristics of these elements are defined in terms of their nodal displacements (nodes are the connecting points of the finite elements) and the forces externally applied to these nodes. By defining the material properties, the geometry of the finite element system, the locations and magnitudes of the applied forces and the boundary conditions of the structure, the displacement and stress distribution within the material continuum can be calculated.

MODEL DESCRIPTION

Figure 8:
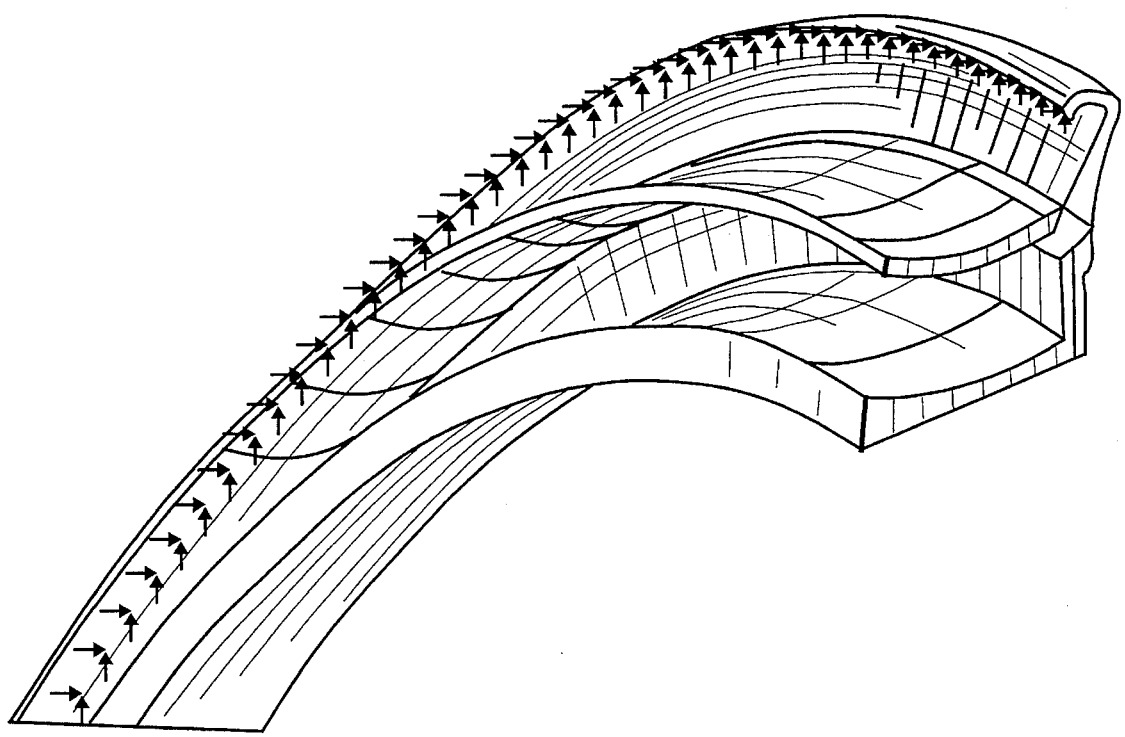
FIG. 8 illustrates a finite element model of the embodiment shown in FIG. 5.

FIG. 8 shows a typical model used for evaluating the rim designs discussed herein. The model represents a segment of the actual rim (45 degree arc) with appropriate boundary conditions to simulate the effects of the remaining portion of the structure. The model takes advantage of symmetry to reduce the computer run time. The model contains approximately 6000 solid elements to represent the material continuum. Externally applied loads include the tire bead load, spoke pre-load and the tire pressure load (not shown in FIG. 8).

Since this study was to be a comparative study, a common loading condition was set up for each rim evaluation. This loading condition consisted of the following:

Tire pressure=65 psig
Spoke pre-load=100 lbf/spoke
Tire bead load (horizontal)=12.8 lbf/node
Tire bead load (vertical)=4.5 lbf/node

FEA RESULTS

The results of the finite element analysis were obtained in terms of maximum nodal displacement and maximum Von-Mises stress. Table 1 summarizes the results.

TABLE 1

| Design I.D. | Section Area (in^2) | VonMises Stress (psi) | Node Displacement (in) |
|---|---|---|---|
| Design #1 | 0.139858 | 30,900 | 0.012056 |
| Design #2 | 0.131418 | 33,200 | 0.011707 |

TABLE 1-continued

Summary of FEA Results

| Design I.D. | Section Area (in^2) | VonMises Stress (psi) | Node Displacement (in) |
|---|---|---|---|
| Design #3 | 0.139287 | 36,000 | 0.010909 |
| Ref #1 | 0.147887 | 38,900 | 0.016679 |
| Ref #2 | 0.121509 | 62,200 | 0.025287 |

These results along with the weight properties of the rim section were used to rank the different rim designs. The following ranking parameters were used:

Peak VonMises Stress
Specific Stiffness Ratio
Rim Weight

The peak VonMises Stress parameter was obtained directly from the FEA results. This parameter represents the equivalent "tension stress" for a bi-axial stress field and can be compared to the yield and fatigue properties of the rim material under consideration. Table 2 ranks the rim designs based upon the calculated peak VonMises stress values. The ranking goes from the lowest stress (best) to the highest (worst).

TABLE 2

Design Ranking Based on VonMises Stress

| Rank | Design I.D. | Peak VonMises Stress (psi) |
|---|---|---|
| 1 | Design #1 | 30,900 |
| 2 | Design #2 | 33,200 |
| 3 | Design #3 | 36,800 |
| 4 | Reference #1 | 38,900 |
| 5 | Reference #2 | 62,200 |

The Specific Stiffness Ratio is a factor that is derived to represent the efficiency of the section. The factor is calculated from, Rank Value=D(ref)*A(ref)*Den(ref)/ (D(x)*A(x)*Den(x)) where, D(ref)=Maximum nodal displacement for reference design.
A(ref)=Section area for reference design.
Den(ref)=Material density for reference design.
D(x)=Maximum nodal displacement for design x.
A(x)=Section area for design x.
Den(x)=Material density for design x.

Table 3 ranks the designs based upon the above Rank Value parameter. The ranking is from the highest rank value (best) to the lowest (worst).

TABLE 3

Section Efficiency

| Rank | Design | Rank Value |
|---|---|---|
| 1 | Design #2 | 2.2190 |
| 2 | Design #1 | 2.0247 |
| 3 | Design #3 | 2.0220 |
| 4 | Ref #1 | 1.2456 |
| 5 | Ref #2 | 1.0000 |

Table 4 ranks the designs based upon the section weight. This can be calculated from the following:

Wt(x)=A(x) * Den(x)

The ranking in Table 4 goes from the lightest section (best) to the heaviest section (worst). The material density values assumed in the calculations were 0.1 lb/in^3 for medium strength aluminum alloy and 0.09 lb/in^3 for the high strength aluminum/lithium alloy.

TABLE 4

Section Weight

| Rank | Design | Section Wt. (lbm/in) |
|---|---|---|
| 1 | Design #2 | 0.01183 |
| 2 | Ref #2 | 0.01215 |
| 3 | Design #1 | 0.01259 |
| 4 | Design #3 | 0.01393 |
| 5 | Ref #1 | 0.01479 |

CONCLUSIONS

The results of the finite element analysis show that the rim designs encompassed by this invention are significantly more efficient than the referenced, prior art designs. The disclosed rim section designs provide lower stress levels and higher stiffness values than the reference rim designs, for the same loading conditions. These designs accomplish this at nearly the same section weight as the lightest prior art rim design currently on the market. Additional improvement to the disclosed design is possible by moving Item D (FIG. 5) and Item I (FIG. 6) up higher in the section. This will, in effect, reduce the cantilever action of the sides of the rim, making them stiffer and stronger. This will also increase the bottom cavity size of the rim thereby increasing its torsional stiffness. However, experience has shown that this will make changing the tire more difficult and hence is a less preferred embodiment and a trade-off that must be considered. The invention as depicted allows for easier tire changing than prior art designs. A foldable or wire bead type tire casing of the appropriate size can be installed by hand using no tire levers or other implements.

What is claimed is:

1. In a bicycle wheel having a hub, an annular rim having a spoke connection area, spokes connecting said rim to said hub and extending from said hub to spoke connecting area on said rim, improvements in said rim wherein:

said annular rim having:
a pair of circumferential flanges, each said circumferential flange having inner and outer surfaces and, in radial directions, inside and outside ends, said circumferential flanges being joined at their inner ends by at least one torque tube, said inner surfaces of said pair of flanges diverging away from each other a first predetermined amount and having tire retaining beads formed at their outside ends, respectively, said outer surfaces diverging outwardly from each other towards said outer ends a second predetermined amount to improve tire stability in cornering and side skid maneuvers,
a substantially flat tension web forming (1) an upper wall of one of said at least one torque tubes and (2) an inner air pressure reacting member, and
annular rib means juxtaposed adjacent said spoke connecting area to provide strength for said rim, support for spoke nipples on the sides and prevent lateral cracks from forming in said area.

2. The bicycle wheel defined in claim 1 wherein said rim is an extension and includes three integral torque tubes, two of said torque tubes being symmetrically disposed to the sides of said rim such that said circumferential flanges merge smoothly thereunto and a third torque tube including said flat tension web as a wall portion thereof and further including said spoke connecting areas.

3. The bicycle wheel defined in claim 2 wherein said rib means is constituted by at least a pair of spaced ribs circumferentially disposed about the interior of said third torque tube and along said spoke connecting area.

4. The bicycle wheel defined in claim 1 wherein said annular rib means is constituted by a pair of annular ribs on the interior of said one or more torque tubes having said spoke connecting area.

5. The bicycle wheel defined in claims 1, 2, 3 or 4 wherein the sidewall sections are angled at approximately 18.8 degrees to more nearly approach the pulling direction of a tire casing when engaged with said tire retaining beads.

6. The bicycle wheel defined in claims 1, 2, 3 or 4 wherein said flat tension web is positioned to provide improved torsional rigidity to said torsion tube and said rim, increase lateral stiffness and reduce weight.

7. The invention defined in claims 1, 2, 3 or 4 wherein said spoke connection area has an external shape which approaches a "V" shape to minimize out-of-plane bending, fatigue failure and stress in the rim walls and create mainly tension stresses within the plane of the rim walls and thereby strengthen said rim walls.

8. The bicycle wheel defined in claims 1, 2, 4 or 3 wherein said spoke connecting area is formed with a heavier wall section, including said annular rib means.

9. The bicycle rim defined in one of claims 1, 2, 3, or 4 wherein said rim is made of an aluminum alloy containing Lithium.

10. The rim defined in one of claims 1, 2, 3, or 4, wherein said bicycle rim is made from an aluminum alloy and includes minority amounts of one or more of the following elements: Lithium, copper, silicon, magnesium, and zirconium.

11. A lightweight bicycle rim formed of an extruded metal alloy and having a pair of circumferential flanges and a plurality of integrally formed and symmetrical annular torque tubes for improved torsional rigidity including a central torque tube and means forming an annular spoke connection area on said central torque tube, said spoke connection area being "V" shaped and having one or more annular surface ribs in said spoke connection area.

12. The bicycle wheel defined in claim 11, said annular spoke connected area having an interior and wherein said one or more annular ribs are on said interior of said spoke connection area.

13. A bicycle rim made of an extruded lightweight metal alloy, said rim having a pair of circumferential flanges, each said circumferential flange having inner and outer surfaces and, in radial directions, inside and outside ends, said circumferential flanges being joined at their inner ends by one or more torque tubes, said inner surfaces of said pair of flanges diverging away from each other a first predetermined amount and having tire retaining beads formed at their outside ends, respectively, said outer surfaces diverging outwardly from each other towards said outer ends a second predetermined amount to improve tire stability in cornering and side skid maneuvers, a substantially flat tension web forming (1) an upper wall of said one or more torque tubes and (2) an inner air pressure reacting member, and annular rib means juxtaposed adjacent said spoke connecting area to provide strength for said rim, support for spoke nipples on the sides and prevent lateral cracks from forming in said area.

14. The bicycle rim defined in claim 13 wherein said rim includes three integral torque tubes integrally formed with said circumferential flanges, two of said torque tubes being symmetrically disposed to the sides of said rim such that said circumferential flanges merge smoothly thereunto and a third torque tube including said flat tension web as a wall portion thereof and further including said spoke connecting areas.

15. The bicycle invention defined in claim 13 wherein said annular rib means include a pair of internal ribs straddling said spoke connecting areas.

16. An aluminum/Lithium alloy bicycle rim extrusion having a metal cross-sectional area a pair of circumferential flanges, each said circumferential flange having inner and outer surfaces and, in radial directions, inside and outside ends, said circumferential flanges being joined at their inner ends by at least one torque tube, said inner surfaces of said pair of flanges diverging away from each other a first predetermined amount and having tire retaining beads formed at their outside ends, respectively, said outer surfaces diverging outwardly from each other towards said outer ends a second predetermined amount to improve tire stability in cornering and side skid maneuvers, a substantially flat tension web forming (1) an upper wall of one of said at least one torque tubes and (2) an inner air pressure reacting member, and annular rib means juxtaposed adjacent said spoke connecting area to provide strength for said rim, support for spoke nipples on the sides and prevent lateral cracks from forming in said area.

17. An aluminum/Lithium alloy bicycle rim extrusion having a metal cross-sectional area a pair of circumferential flanges, each said circumferential flange having inner and outer surfaces and, in radial directions, inside and outside ends, three integral torque tubes, two of said torque tubes being symmetrically disposed to the sides of said rim such that said circumferential flanges merge smoothly thereunto and a third torque tube including a flat tension web as a wall portion thereof and further including spoke connecting areas said circumferential flanges being joined at their inner ends by at least one torque tube, said inner surfaces of said pair of flanges diverging away from each other a first predetermined amount and having tire retaining beads formed at their outside ends, respectively, said outer surfaces diverging outwardly from each other towards said outer ends a second predetermined amount to improve tire stability in cornering and side skid maneuvers, a substantially flat tension web forming (1) an upper wall of one of said at least one torque tubes and (2) an inner air pressure reacting member, and annular rib means juxtaposed adjacent said spoke connecting area to provide strength for said rim, support for spoke nipples on the sides and prevent lateral cracks from forming in said area.

* * * * *